(12) United States Patent
Kaneko et al.

(10) Patent No.: US 12,479,413 B2
(45) Date of Patent: Nov. 25, 2025

(54) VEHICLE CONTROL DEVICE AND METHOD

(71) Applicant: Honda Motor Co., Ltd., Tokyo (JP)

(72) Inventors: Toshimi Kaneko, Tokyo (JP); Taichi Kitamura, Tokyo (JP); Kazuya Moriyama, Tokyo (JP); Yurina Morimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 18/433,329

(22) Filed: Feb. 5, 2024

(65) Prior Publication Data
US 2024/0326772 A1 Oct. 3, 2024

(30) Foreign Application Priority Data

Mar. 29, 2023 (CN) .......................... 202310318198.7

(51) Int. Cl.
*B60W 10/18* (2012.01)
*B60T 7/12* (2006.01)
*B60W 10/10* (2012.01)
*B60W 10/188* (2012.01)

(52) U.S. Cl.
CPC ............. *B60W 10/182* (2013.01); *B60T 7/12* (2013.01); *B60W 10/10* (2013.01); *B60W 10/188* (2013.01)

(58) Field of Classification Search
CPC .......... B60T 13/662; B60T 7/12; B60T 7/122; B60W 10/10; B60W 10/182; B60W 10/188
See application file for complete search history.

(56) References Cited

U.S. PATENT DOCUMENTS

| | | | | |
|---|---|---|---|---|
| 4,462,487 A | * | 7/1984 | Warwick | B60T 11/103 192/221 |
| 5,696,679 A | * | 12/1997 | Marshall | F16H 63/3416 701/1 |
| 9,233,666 B2 | * | 1/2016 | Al-Regib | B60W 10/18 |
| 11,834,044 B2 | * | 12/2023 | Koh | F16H 59/18 |
| 12,122,385 B1 | * | 10/2024 | Takada | B60W 30/18181 |
| 2010/0048352 A1 | * | 2/2010 | Yamamoto | B60T 7/12 477/92 |

(Continued)

FOREIGN PATENT DOCUMENTS

JP 2009166656 7/2009

*Primary Examiner* — Carl C Staubach
(74) *Attorney, Agent, or Firm* — JCIPRNET

(57) ABSTRACT

A vehicle control device includes: a gear changing part having a parking brake holding the vehicle in a stationary state, a driving gear that maintains driving the vehicle, and a parking gear that holds a parked state; a control switch disposed in the gear changing part and able to perform actuation of the parking brake and the parking gear simultaneously through an operation of pressing the control switch; a braking force holding part holding a braking force when the vehicle generates the braking force based on at least one of a driver operating a brake or operating the control switch; and a control part performing: when the control switch is pressed, performing a linked parking control so that the parking brake performs a linked actuation while the gear changing part is shifted to the parking gear. After the linked parking control ends, the holding of the braking force is released.

8 Claims, 6 Drawing Sheets

(56) References Cited

U.S. PATENT DOCUMENTS

| | | | | |
|---|---|---|---|---|
| 2010/0326787 | A1* | 12/2010 | Giefer | B60T 7/085 |
| | | | | 192/220.2 |
| 2012/0010792 | A1* | 1/2012 | Nedorezov | F02N 11/00 |
| | | | | 701/54 |
| 2013/0252784 | A1* | 9/2013 | Kinoshita | F16H 61/12 |
| | | | | 477/92 |
| 2015/0232100 | A1* | 8/2015 | Yamamoto | B60W 30/18118 |
| | | | | 477/92 |
| 2016/0319933 | A1* | 11/2016 | Adams | F16H 63/48 |
| 2018/0029577 | A1* | 2/2018 | Beauvais | B60T 8/176 |
| 2018/0072292 | A1* | 3/2018 | Renaud | B60T 13/686 |
| 2019/0031162 | A1* | 1/2019 | Besier | B60T 8/176 |
| 2019/0135249 | A1* | 5/2019 | Fridman | B60T 1/10 |
| 2022/0170545 | A1* | 6/2022 | Schlegelmilch | B60T 1/062 |
| 2024/0034301 | A1* | 2/2024 | Deckmyn | B60W 10/08 |
| 2024/0239319 | A1* | 7/2024 | M R | B60T 7/085 |
| 2024/0326812 | A1* | 10/2024 | Takada | B60W 10/188 |

* cited by examiner

VEHICLE CONTROL DEVICE AND METHOD

CROSS-REFERENCE TO RELATED APPLICATION

This application claims the priority benefit of China application serial no. 202310318198.7, filed on Mar. 29, 2023. The entirety of the above-mentioned patent application is hereby incorporated by reference herein and made a part of this specification.

BACKGROUND

Technical Field

The disclosure relates to a vehicle control device and a method.

Description of Related Art

In the related art, a control method is known, in which when the parking brake (electronic parking brake, EPB) switch is pulled while the vehicle is driving, emergency braking (dynamic EPB) is activated. In addition, in the existing dynamic EPB control, if the gear is shifted to the P gear while driving, the control method of shifting to the N gear (neutral gear) is known.

Also, in order to improve the operability of the driver, for example, removing the switch-related components from the center console and integrating the shifter and the electronic parking brake (EPB) switch into a one way switch are discussed. However, by integrating into the one way switch, the "emergency braking" operation performed using the existing parking brake switch EPBSW is no longer possible. Also, if the parking brake switch EPBSW is operated by mistake and the driver wants to return to driving immediately, then it is hard to quickly return to the N gear.

Patent Literature 1 (Japanese Patent Application No. 2009-166656) discloses a brake control system which can apply a braking force sufficient to stop the vehicle when the parking brake is operated while the vehicle is driving. A feature of the related art is that when a dedicated switch (EPB switch, etc.) for operating the parking brake is operated, the parking brake is actuated when the vehicle speed is low, and the vehicle is controlled to decelerate when the vehicle speed is high. The above is that the user realizes the operation by operating the parking brake switch, and the vehicle applies the parking brake or the brake according to the vehicle speed, which is different from the purpose (deceleration/stop) of the user.

In addition, in order not to prompt the user to perform complicated operations, for a vehicle (for example, a vehicle integrating the parking gear (P gear) of the shifter and the operation switch of the parking brake) without the dedicated switch for the parking brake, even when operating switches with functions other than the parking brake, there is room for improvement in achieving behavior consistent with the purpose of the user.

However, how to optimize the operation of the one way control switch that integrates the parking gear switch and the parking brake switch is an issue. The disclosure aims to improve the operability of the one way control switch that integrates the parking gear switch/the parking brake switch. Moreover, the traffic safety is further improved so that it is beneficial to develop sustainable transportation systems.

SUMMARY

The disclosure is directed to a vehicle control device that changes the operation of the one way switch according to the time when the driver operates the one way switch.

According to an embodiment of the disclosure, a vehicle control device configured to control a vehicle is provided. The vehicle control device includes: a gear changing part having a parking brake that holds the vehicle in a stationary state, a driving gear that maintains driving the vehicle, and a parking gear that holds a parked state; a control switch disposed in the gear changing part and able to perform actuation of the parking brake and the parking gear simultaneously through an operation of pressing the control switch; a braking force holding part holding a braking force when the vehicle generates the braking force based on at least one of a driver operating a brake or operating the control switch; and a control part performing control operations as the following while the vehicle is in a parked state. When the control switch is pressed while the vehicle is in the parked state, a linked parking control is performed so that the parking brake performs a linked actuation while the gear changing part is shifted to the parking gear. The braking force holding part holds the braking force until the linked parking control ends. After the linked parking control ends, the braking force holding part releases the holding of the braking force.

According to another embodiment of the disclosure, a vehicle control method used for a vehicle control device configured to control a vehicle is provided. The vehicle control device includes: a gear changing part having a parking brake that holds the vehicle in a stationary state, a driving gear that maintains driving the vehicle, and a parking gear that holds a parked state; and a control switch disposed in the gear changing part and able to perform actuation of the parking brake and the parking gear simultaneously through an operation of pressing the control switch. The vehicle control method includes the following. A braking force is held when the vehicle generates the braking force based on at least one of a driver operating a brake or operating the control switch. When the control switch is pressed while the vehicle is in the parked state, a linked parking control is performed so that the parking brake performs a linked actuation while the gear changing part is shifted to the parking gear. The braking force is held until the linked parking control ends. After the linked parking control ends, the holding of the braking force is released.

DESCRIPTION OF THE EMBODIMENTS

Figure 1:
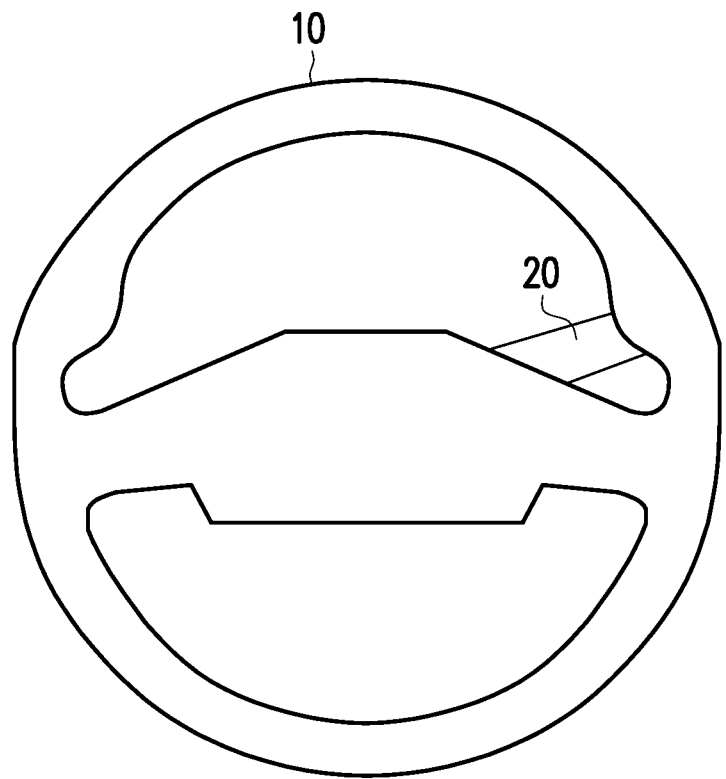
FIG. 1 shows an example of a configuration of a steering wheel and a shifter of a vehicle.

Reference will now be made in detail to the exemplary embodiments of the disclosure, examples of the exemplary embodiments are illustrated in the accompanying drawings. Whenever possible, the same reference numerals are used in the drawings and descriptions to refer to the same or similar parts.

According to an embodiment of the disclosure, the vehicle control device further includes a vehicle speed detection part configured to detect a vehicle speed of the vehicle. When the vehicle speed detection part detects that the vehicle speed of the vehicle is above a threshold value, and when the control switch is operated for a short time, deceleration control through the hydraulic brake is performed, and when the control switch is operated for a long time, the deceleration control through the hydraulic brake is performed. After a predetermined time passes, the vehicle speed detection part detects again. If the vehicle speed is above the threshold value, then the deceleration control through the hydraulic brake is continued. After the predetermined time passes again, if the vehicle speed is below the threshold value, then the deceleration control through the hydraulic brake is ended, and the linked parking control is performed.

According to an embodiment of the disclosure, the vehicle control method further includes the following. A vehicle speed of the vehicle is detected. When it is detected that the vehicle speed of the vehicle is a speed above a threshold value, control operations as the following are performed. When the control switch is operated for a short time, deceleration control through the hydraulic brake is performed, and when the control switch is operated for a long time, the deceleration control through the hydraulic brake is performed. After a predetermined time passes, the vehicle speed detection part detects again. If the vehicle speed is above the threshold value, then the deceleration control through the hydraulic brake is continued. After the predetermined time passes again, if the vehicle speed is below the threshold value, then the deceleration control through the hydraulic brake is ended, and the linked parking control is performed.

According to the embodiment of the disclosure, even if it is a control switch (implemented as a parking gear switch) that integrates the operating switch of the parking gear and the parking brake, the switch can perform according to the vehicle speed. At a high speed, the operation of the parking brake (deceleration caused by the hydraulic brake, i.e., dynamic EPB) is performed, and at a low speed, the operation of the parking gear (i.e., shift to the parking gear) is performed. Therefore, a single control switch able to perform two functions is achieved.

Also, by integrating the parking brake actuation (EPB actuation) and shift to the parking gear (P gear) into one control switch, when the control switch is pressed for a preset time, the parking brake is actuated along with the shift to the P gear, which reduces the quantity of parts that the driver has to operate. By performing the above operations, the operability of the driver is improved, and different behaviors can be performed according to the intention of the driver, thereby the commerciality is improved.

Figure 2:
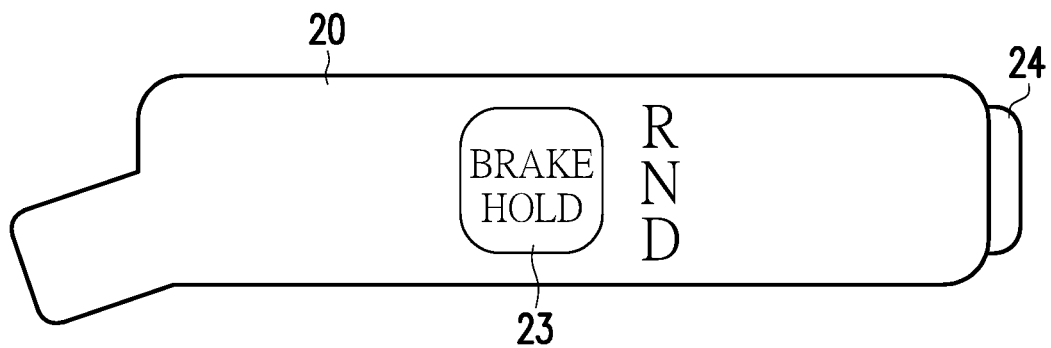
FIG. 2 shows an example of a configuration of a shifter according to an embodiment of the disclosure.
Figure 3:
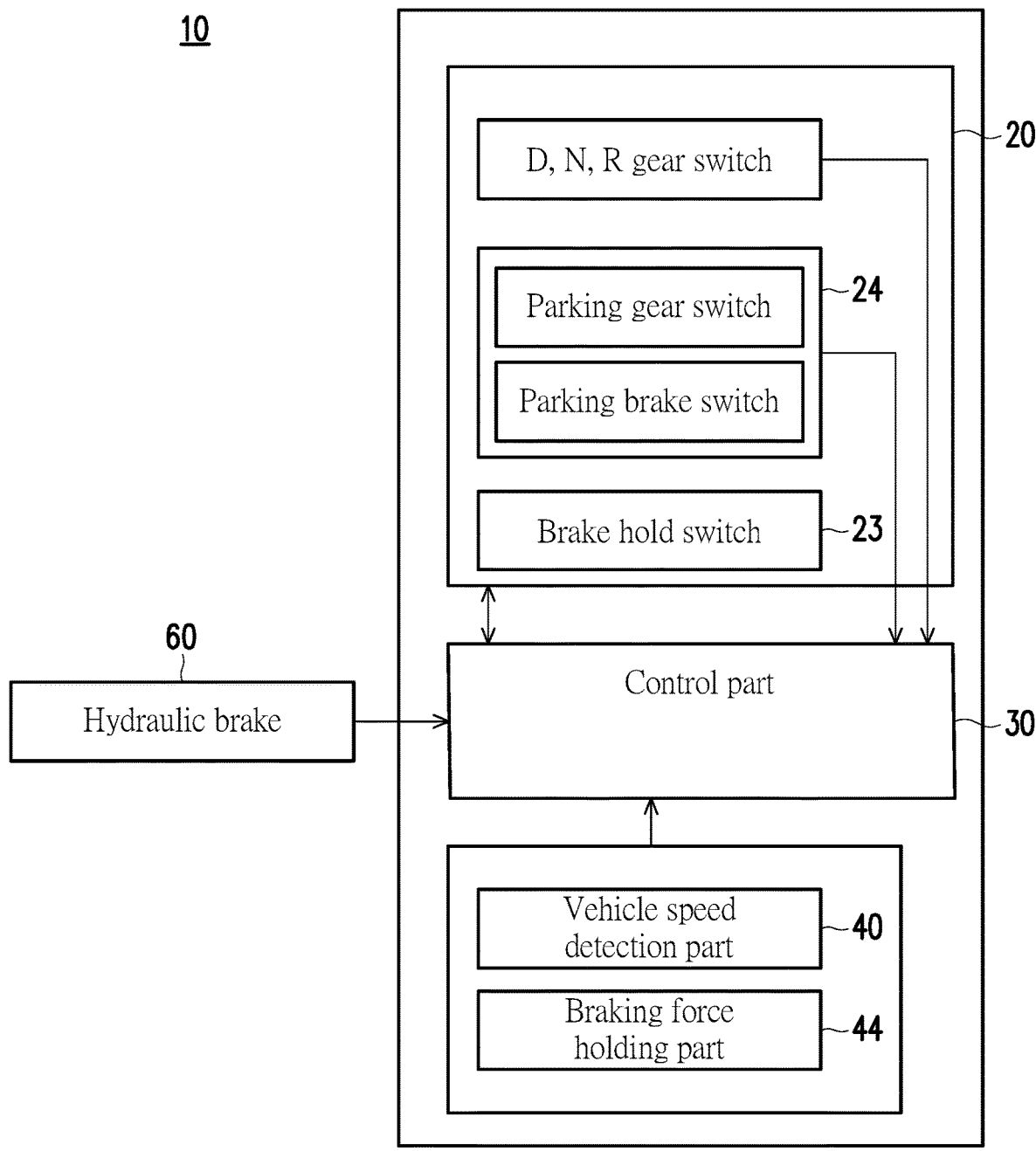
FIG. 3 shows a block diagram of a vehicle control device according to the disclosure.

FIG. 1 shows an example of a configuration of a steering wheel and a shifter of a vehicle. FIG. 2 shows an example of a configuration of a shifter according to an embodiment of the disclosure. FIG. 3 shows a block diagram of a vehicle control device according to the disclosure.

As shown in FIG. 1, a shifter (or a gear changing part) 20 is disposed on a steering column (not shown) on which a steering wheel 28 of the vehicle is installed. This is merely an exemplary example. The shifter 20 may also be disposed at other positions convenient for the operation of the driver, and the disclosure is not limited thereto.

As shown in FIG. 2 and FIG. 3, the shifter 20 includes the functions of a parking brake switch (performed by the control switch 24) EPBSW and a parking gear switch (performed by the control switch 24) PSW. The parking brake is a handbrake of the vehicle configured to hold the vehicle in a stationary state so that the vehicle does not move. A driving gear 21 is configured to drive the vehicle. A parking gear is to maintain the vehicle in the parked position.

Here, the shifter 20 of a general automatic transmission vehicle may at least include a driving gear (D), a neutral gear (N), and a reverse gear (R). The gear shift of the shifter 20 is performed, for example, by operating the drive gear switch 21 to switch between D, N, and R gears. The shift of the shifter 20 may be implemented in any existing manner, and is not particularly limited by the disclosure.

Also, the shifter 20 may further include a brake hold switch 23. The brake hold is an automatic park hold system. The brake hold switch 23 may be implemented in any existing manner, and is not particularly limited by the disclosure.

According to an embodiment of the disclosure, the vehicle control device 10 may further include a braking force holding (hydraulic pressure maintaining) part 44 that maintains the hydraulic pressure to hold a braking force when the vehicle generates the braking force based on at least one of the driver operating the hydraulic brake 60 or operating the control switch 24. For example, the braking force holding part 44 maintains the hydraulic pressure generated by the hydraulic brake 60 based on the operation of the brake pedal (BP) by the driver. This hydraulic pressure is configured to maintain the actuation of the hydraulic brake 60 of the vehicle. Furthermore, the braking force holding part 44 may activate the dynamic parking brake EPB to generate the hydraulic pressure based on the operation of the control switch 24 by the driver and maintain the hydraulic pressure to hold the braking force.

According to an embodiment of the disclosure, the shifter 20 includes a control switch 24, which is configured to control the actuation of the parking brake EPB and the shift to the parking gear (P). In other words, the control switch 24 can simultaneously serve the actuation of the parking brake switch EPBSW and the parking gear switch PSW, which is mainly determined by the time the control switch 24 is pressed.

As shown in FIG. 3, the vehicle control device 10 of the disclosure further includes a control part 30. The control part 30 is, for example, a processor that controls the overall operation of the vehicle, and may be implemented using, for example, an ECU (electronic control unit). In this embodiment, description related to parking control is focused, and the description of other control parts is omitted. According to the embodiment of the disclosure, the control part 30 controls, for example, the control switch 24 so that the control switch 24 can perform the actuation of the parking brake EPB and the shift to the parking gear (P).

After the control part 30 receives the pressing information of the control switch 24, especially the pressing time, the pressing time may be compared with the predetermined time to make an appropriate parking control.

Therefore, whether it is linked parking or ESB switch release during parking, merely one control switch 24 is required, and there is no need to use two switches, the parking gear switch PSW and the parking brake switch EPBSW. In this embodiment, merely one control switch 24 is required to be disposed, and different pressing modes may be set to allow one control switch 24 to perform two parking functions.

According to the above, the actuation of the parking brake EPB and the shift to the parking gear (P gear) are integrated into one control switch. When the control switch is pressed for a preset time, the parking brake EPB is in linked actuation with the shift to the P gear, which reduces the quantity of parts that the driver has to operate and keeps the maintainability (maintenance) required of the vehicle.

According to an embodiment of the disclosure, the control part 30 performs control operations as the following when the vehicle is in the parked state: when the control switch 24 is pressed while the vehicle is in the parked state, the linked parking control is performed, by which when the gear changing part 20 is shifted to the parking gear (P gear), the parking brake EPB is in linked actuation. The braking force holding part 44 holds the braking force until the linked parking control ends. Also, after the linked parking control ends, the braking force holding part 44 releases the holding of the braking force.

Figure 4A:
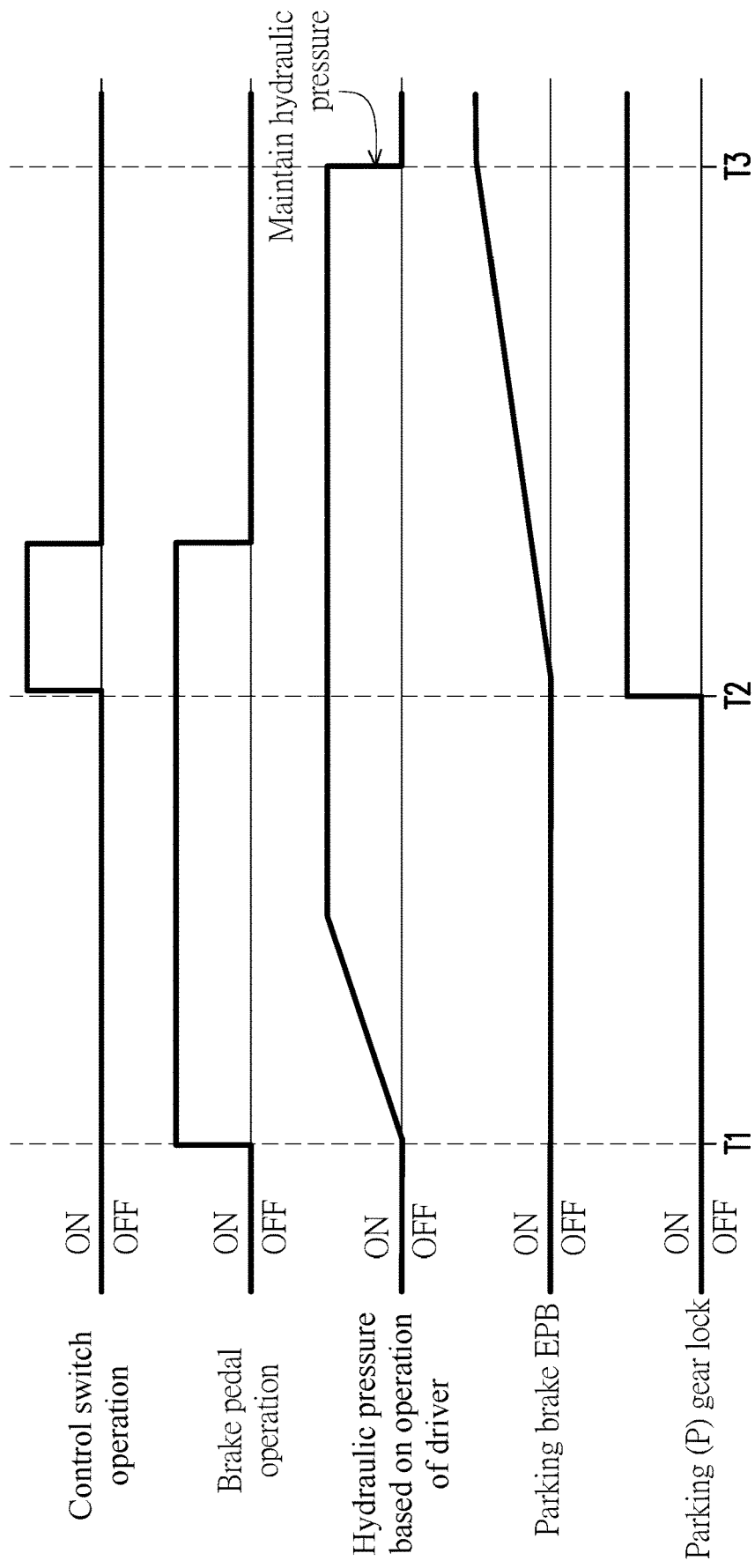
FIG. 4A and FIG. 4B show a timing chart of a parking linkage actuation of the vehicle control device according to the disclosure.

As shown in FIG. 4A, at a time point T1, the driver steps on the brake pedal to start operating the hydraulic brake 60, and the speed of the vehicle starts to decrease. At the same time, based on the operation of the driver, that is, stepping on the brake pedal, the hydraulic pressure of the hydraulic brake 60 starts to be generated. At this time, the parking brake EPB has not yet been actuated, and the gear changing part 20 is still in the driving gear (such as D gear) and has not been switched to the parking gear (P gear) yet.

Afterward, at a time point T2, the driver presses the control switch 24 (the linked actuation of the parking brake EPB and the P gear). At this time, as shown in FIG. 4A, the parking brake EPB starts to actuate, and the gear changing part 20 also shifts to the parking gear (P gear lock). In addition, when stepping on the brake pedal ends, the pressing of the control switch 24 also ends.

At a time point T3, the hydraulic pressure is released only after the actuation of the parking brake EPB and the P gear lock (the linked parking control) is completed. That is, until the actuation of the parking brake EPB and the P gear lock is completed, the braking force holding part 44 continues to hold the braking force, that is, to maintain the hydraulic pressure. After the linked parking control ends, the braking force holding part 44 releases the holding of the braking force.

Figure 4B:
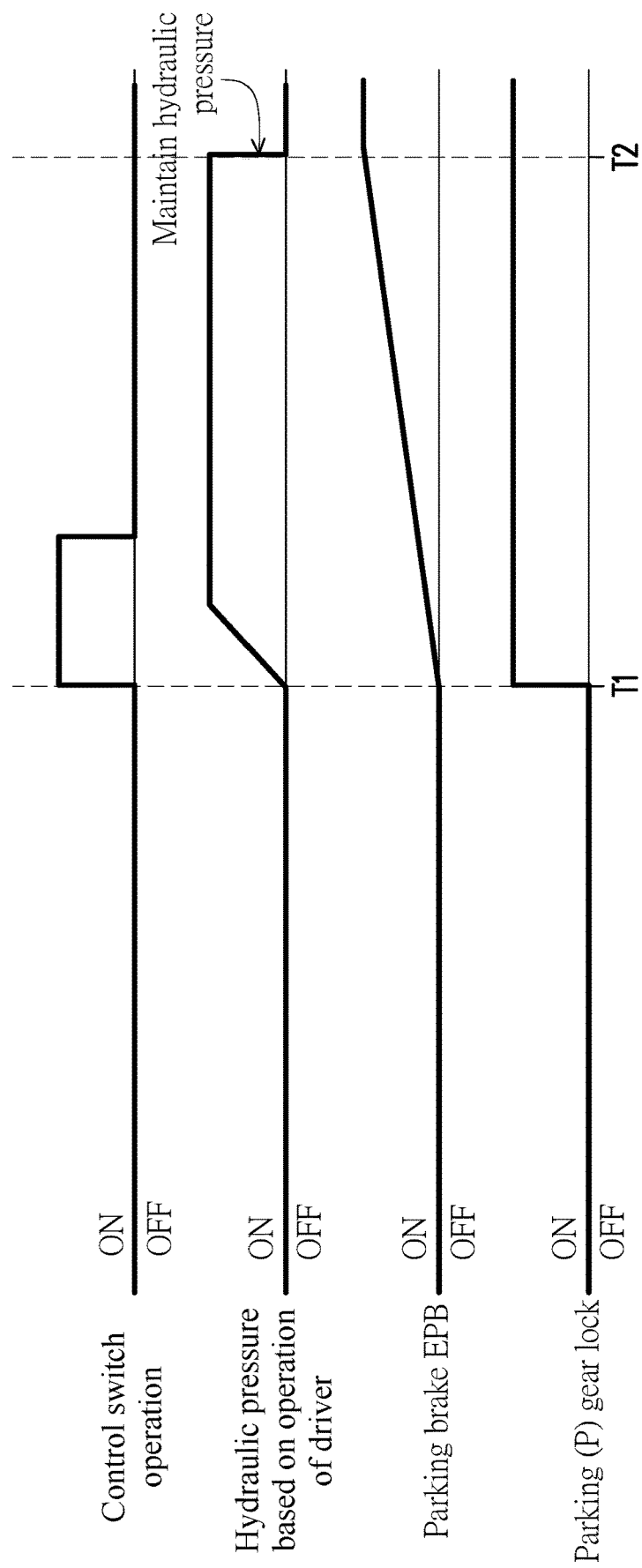

Also, as shown in FIG. 4B, this example illustrates an example in which merely the control switch 24 is pressed without stepping on the brake pedal. At the time point T1, the driver presses the control switch 24 (the linked actuation of the parking brake EPB and the P gear). At this time, as shown in FIG. 4A, the parking brake EPB starts to actuate, and the gear changing part 20 also shifts to the parking gear (P gear lock). At this time, the driver does not step on the brake pedal. Through pressing the control switch 24, the hydraulic pressure is generated to serve as the dynamic parking brake EPB. At this time, the gear changing part 20 also shifts to the parking gear (P gear lock).

At the time point T2, the hydraulic pressure is released only after the actuation of the parking brake EPB and the P gear lock (the linked parking control) is completed. That is, until the actuation of the parking brake EPB and the P gear lock is completed, the braking force holding part 44 continues to hold the braking force, that is, to maintain the hydraulic pressure. After the linked parking control ends, the braking force holding part 44 releases the holding of the braking force.

Through this implementation, by using one control switch (implemented by the parking gear (P gear) switch) integrating the operating switch of the parking brake EPB and the parking gear, after the vehicle is changed to the parked state (a state in which the vehicle is immobilized by the parking gear lock and the parking brake EPB), since the braking force is released by the hydraulic brake, the vehicle becomes immobilized by the parking brake or the hydraulic brake, which can suppress the load of immobilizing the vehicle caused by the parking gear (for example, the vibration or sound generated when the parking lock and the parking gear are engaged and released).

Furthermore, according to the embodiment of the disclosure, the vehicle control device 10 may further include a vehicle speed detection part 40 configured to detect the current vehicle speed of the vehicle. The vehicle speed can be obtained by detecting the rotation speed using sensors disposed near the wheels. The vehicle speed may also be detected using various available sensors, such as image analysis and processing after shooting by a camera, radar, lidar, and other available technical means, which are not particularly limited by the disclosure.

According to the embodiment of the disclosure, using the optimal vehicle speed that allows the gear changing part 20 to shift into the parking gear (P gear) as a threshold value, the control part 30 can change the behavior (parking behavior) of the vehicle according to the operation time of the driver operating the control switch 24.

Figure 5A:
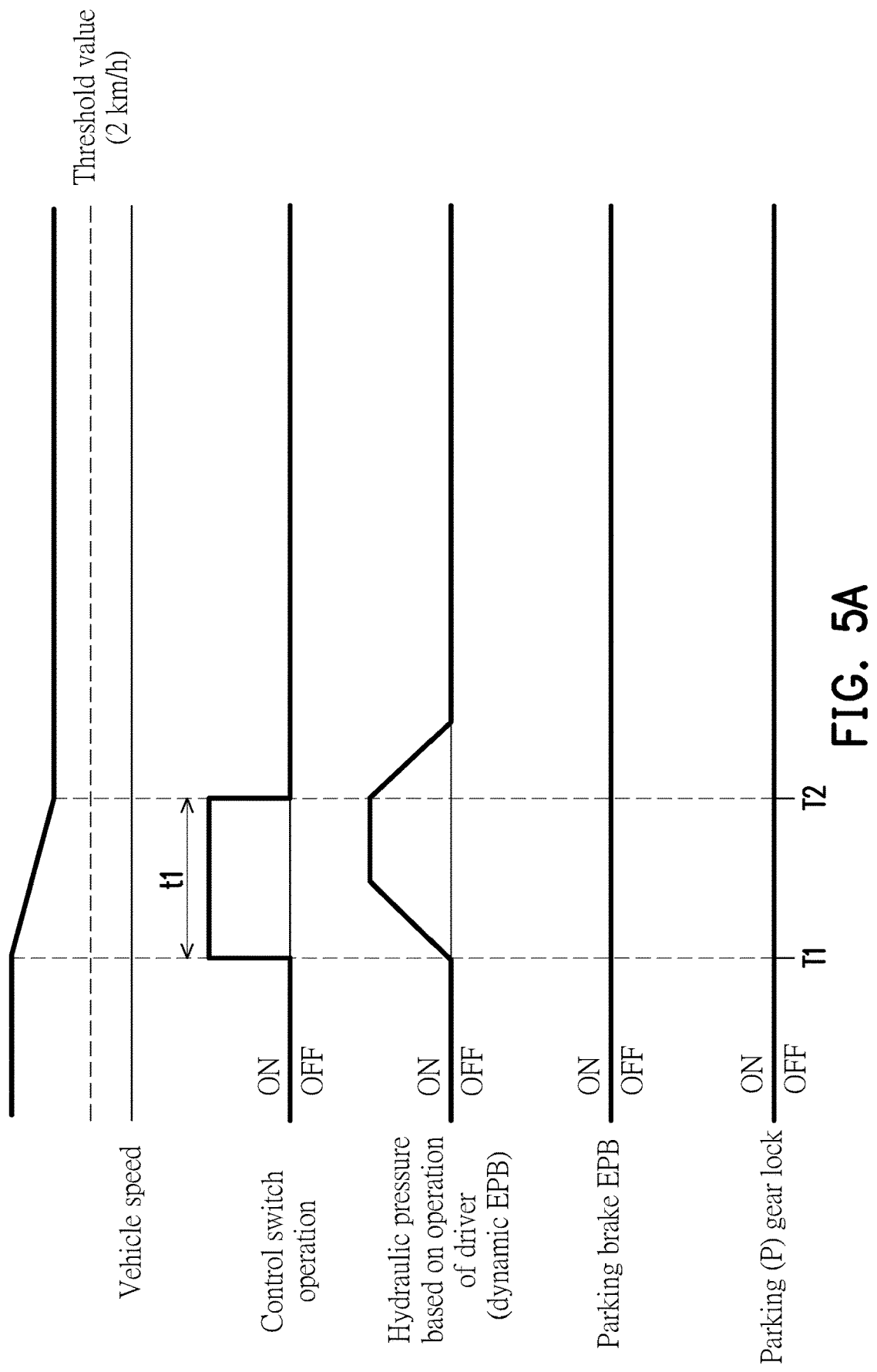
FIG. 5A and FIG. 5B show a timing chart of a parking linkage action of the vehicle control device according to the disclosure.

The embodiment of the disclosure is described with reference to FIG. 5A and FIG. 5B. When the vehicle speed detection part 40 detects that the vehicle speed of the vehicle is a speed above the threshold value, and the control switch 24 is operated (pressed) for a short time t1, the deceleration control (dynamic parking brake EPB) is performed through the hydraulic brake 60. As shown in FIG. 5A, at the time point T1, the vehicle speed detection part 40 detects that the vehicle speed of the vehicle is a speed above the threshold value (2 km/h in this example). At this time, if the control switch 24 is pressed for the time t1, the deceleration control is performed through the hydraulic brake 60, that is, the dynamic parking brake EPB.

Afterward, at the time point T2, after the pressing of the control switch 24 ends and the hydraulic brake 60 (dynamic EPB) ends, the vehicle speed detection part 40 detects that the vehicle speed is still above the threshold value, so the control part 30 allows the vehicle to continue traveling. As a result, the parking brake EPB is not actuated, and the gear changing part 20 maintains the driving gear (D gear) and does not shift to the parking gear (P gear).

Figure 5B:
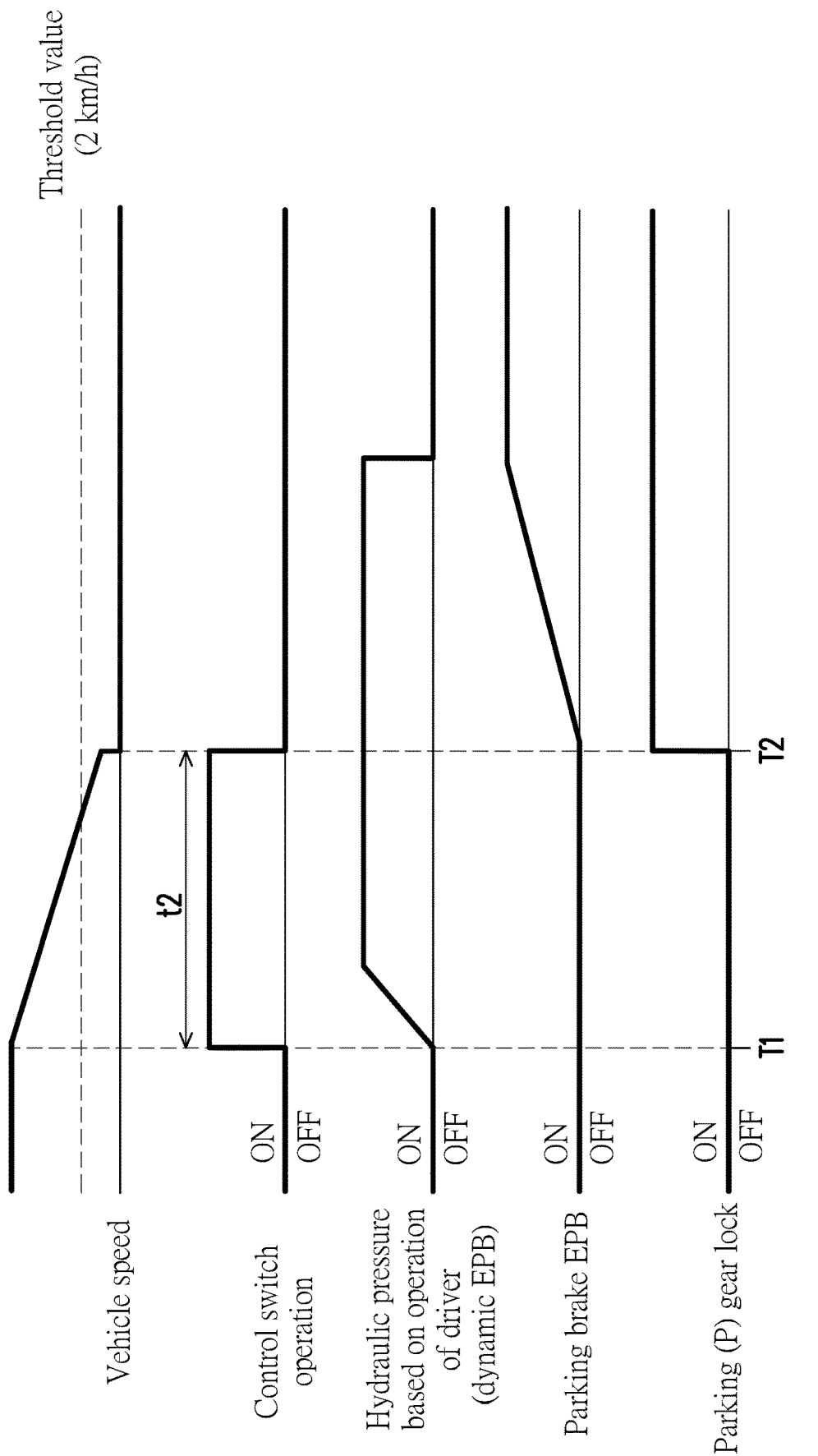

Also, as shown in FIG. 5B, when the driver operates the control switch 24 for a long time (a second time) t2, deceleration control (dynamic EPB) through the hydraulic brake 60 is performed, at the end of the deceleration control, if the vehicle speed is above the threshold value, then the linked parking control is not performed. If the vehicle speed is below the threshold value, then the linked parking control is performed.

As shown in FIG. 5B, when the vehicle speed detection part 40 detects that the vehicle speed is above the threshold value, at the time point T1, the vehicle speed detection part 40 detects that the vehicle speed is above the threshold value (2 km/h in this example). At this time, if the control switch 24 is pressed for the time t2, the deceleration control through the hydraulic brake 60 is performed, that is, the dynamic parking brake EPB is performed.

Next, after a predetermined time has passed, for example, 0.2 seconds, the vehicle speed detection part 40 detects the vehicle speed again. If the detected vehicle speed is above the threshold value, then the deceleration control (dynamic EPB) through the hydraulic brake 60 is continued.

Next, at the time point T2, the pressing of the control switch 24 ends, and the hydraulic brake 60 ends. After a predetermined time (for example, 0.5 seconds) has passed, the vehicle speed detection part 40 detects the vehicle speed again. If the speed of the vehicle drops below the threshold value (2 km/h in this example), then the control part 30 ends the deceleration control through the hydraulic brake 60, and the linked parking control is started. As a result, the parking brake EPB starts to actuate, and the gear changing part 20 shifts to the parking gear (P gear lock). Similarly, the braking force holding part 44 continues to hold the braking force (hydraulic pressure) until the linked parking control ends.

In addition, if at the time point T2, the vehicle speed detection part 40 detects that the vehicle speed of the vehicle is a speed above the threshold value (2 km/h in this example), then the control part 30 does not perform the linked parking control and allows the vehicle to continue traveling.

Therefore, the control part 30 can use the optimal vehicle speed (2 km/h in this example) as a reference for shifting to the parking gear (P gear). This embodiment can change the behavior of the vehicle according to the operation time of the control switch 24, which can realize the vehicle control that reflects the intention of the driver.

Finally, it should be noted that the above embodiments are merely used to illustrate the technical solution of the disclosure, but not to limit the disclosure. Although the disclosure has been described in detail with reference to the embodiments, it should understood that persons of ordinary skill in the art can still modify the technical solutions recorded in the embodiments or make equivalent substitutions for some or all of the technical features. However, the modifications or substitutions do not cause the essence of the corresponding technical solution to depart from the scope of the technical solution of the embodiments of the disclosure.

What is claimed is:

1. A vehicle control device configured to control a vehicle, comprising:
   a gear changing part having a parking brake that holds the vehicle in a stationary state, a driving gear that maintains driving the vehicle, and a parking gear that holds a parked state;
   a control switch disposed in the gear changing part and able to perform actuation of the parking brake and the parking gear simultaneously through an operation of pressing the control switch;
   a braking force holding part holding a braking force in response to the vehicle generating the braking force based on at least one of a driver operating a brake or operating the control switch;
   a control part performing control operations as the following in response to the vehicle being in the parked state: in response to the control switch being pressed while the vehicle being in the parked state, performing a linked parking control so that the parking brake performs a linked actuation while the gear changing part is shifted to the parking gear;
   wherein the braking force holding part holds the braking force until the linked parking control ends, and after the linked parking control ends, the braking force holding part releases the holding of the braking force.

2. The vehicle control device as claimed in claim 1, further comprising:
   a vehicle speed detection part configured to detect a vehicle speed of the vehicle,
   wherein in response to the vehicle speed detection part detecting that the vehicle speed of the vehicle is above a threshold value,
   in response to the control switch being operated for a short time, a deceleration control is performed through a hydraulic brake, and
   in response to the control switch being operated for a long time, the deceleration control is performed through the hydraulic brake, after a predetermined time passes, the vehicle speed detection part detects again, if the vehicle speed is above the threshold value, then the deceleration control through the hydraulic brake is continued, after the predetermined time passes again, if the vehicle speed is below the threshold value, then the deceleration control through the hydraulic brake is ended, and the linked parking control is performed.

3. A vehicle control method used for a vehicle control device configured to control a vehicle, characterized in that the vehicle control device comprises: a gear changing part having a parking brake that holds the vehicle in a stationary state, a driving gear that maintains driving the vehicle, and a parking gear that holds a parked state; and a control switch disposed in the gear changing part and able to perform actuation of the parking brake and the parking gear simultaneously through an operation of pressing the control switch; and a braking force holding part, and the vehicle control method comprises:
   holding a braking force in response to the vehicle generating the braking force based on at least one of a driver operating a brake or operating the control switch;
   in response to the control switch being pressed while the vehicle being in the parked state, performing a linked parking control so that the parking brake performs a linked actuation while the gear changing part is shifted to the parking gear;
   holding the braking force until the linked parking control ends; and
   after the linked parking control ends, releasing the holding of the braking force.

4. The vehicle control method as claimed in claim 3, further comprising:
   detecting a vehicle speed of the vehicle;
   in response to detecting that the vehicle speed of the vehicle is above a threshold value, performing control operations as the following:
   in response to the control switch being operated for a short time, performing a deceleration control through a hydraulic brake; and
   in response to the control switch being operated for a long time, performing the deceleration control through the hydraulic brake, after a predetermined time passes, detecting again by the vehicle speed detection part, if the vehicle speed is above the threshold value, then continuing the deceleration control through the hydraulic brake, after the predetermined time passes again, if the vehicle speed is below the threshold value, then ending the deceleration control through the hydraulic brake, and performing the linked parking control.

5. A vehicle, comprising:
   the vehicle control device as claimed in claim 1.

6. A vehicle, comprising:
   the vehicle control device as claimed in claim 2.

7. A vehicle, comprising:
   a vehicle control device using the vehicle control method as claimed in claim 3.

8. A vehicle, comprising:
a vehicle control device using the vehicle control method as claimed in claim 4.

\* \* \* \* \*